Sept. 15, 1970 J. R. EDWARDS 3,529,251

HIGH SPEED SWITCHING CIRCUIT

Filed Sept. 13, 1967

INVENTOR:
JOHN R. EDWARDS
BY
Marzall, Johnston, Cook & Root
ATT'YS

United States Patent Office 3,529,251

Patented Sept. 15, 1970

3,529,251

HIGH SPEED SWITCHING CIRCUIT

John R. Edwards, 153 S. Park Blvd., Glen Ellyn, Ill. 60137

Filed Sept. 13, 1967, Ser. No. 667,494
Int. Cl. H03f *3/16, 1/02;* H03k *17/60*
U.S. Cl. 330—9 2 Claims

ABSTRACT OF THE DISCLOSURE

The invention disclosed herein consists of high speed switching circuitry for analog computer mode control. The switching circuits, which utilize field effect transistors, provide a low resistance conduction path in the ON state and a very high impedance path in the OFF state. Leakage currents to ground and other points are minimized. Inasmuch as only a few reliable components are used, the overall circuit is simpler and more reliable than previous switching methods.

This invention relates to switching circuits and, more particularly, to high speed switching circuits for analog computer mode control.

In general, the problems solved on analog computers are described in terms of variables and initial conditions which are represented in the analog computer by D-C voltages. These D-C voltages are applied to devices called operational amplifiers which may be designed to perform addition, multiplication, integration and various other mathematical functions. Usually, the operational amplifier consists of a D-C amplifier circuit operated in conjunction with resistive and capacitive feedback networks. To alter the conditions existing on the input of a D-C amplifier circuit rapidly (also called the amplifier summing junction), a reliable, high speed switching circuit is necessary. The available switching methods, however, are not entirely satisfactory. Leakage currents at the amplifier summing junction are a major problem. Furthermore, available methods are complicated and not as reliable as desired.

In addition, when using initial condition networks in conjunction with integrator circuitry, the center point of the initial condition network (also called the initial condition network summing junction or common point) must be brought out to a patch panel termination to allow flexible patching. To permit this, there must be a high impedance to ground at the initial condition network summing junction.

It is an object of the present invention to provide a simple, reliable, accurate and high speed switching technique for analog computer mode control.

It is a further object of the invention to provide a switching circuit which minimizes leakage currents to ground or other points.

It is yet another object of the invention to provide a switching circuit which, when used with initial condition networks, has a high impedance at the initial condition network summing junction.

In general, the present invention consists of high speed switching circuitry for controlling the processing of information in an analog computer. One embodiment of the proposed invention consists of a switching network interposed between an initial condition network and an amplifier summing junction in an integrator ciruit. The switching circuit consists mainly of a field effect transistor having a drain connected to the initial condition circuit summing junction and a source connected to the amplifier summing junction. Two diodes, arranged in an inverse parallel circuit, are connected between the drain of the field effect transistor and ground. This diode circuit insures that the voltage at the drain of the field effect transistor never varies more than a few tenths of a volt; thus preventing inadvertent conduction of the field effect transistor. Furthermore, the diode circuit provides a high impedance to ground when the switch is in the ON state, thus permitting the initial condition circuit summing junction to be used more flexibly than that with other known circuitry. The switch is turned ON and OFF by appropriate signals applied to the gate of the field effect transistor.

In another embodiment of the present invention, a switching network is interposed between a resistor-capacitor network and the D-C amplifier summing junction in an integrator circuit. The switching network consists mainly of a field effect transistor operated in conjunction with a bipolar transistor. The bipolar transistor is arranged in a grounded emitter configuration. The source of the field effect transistor is connected to the amplifier summing junction. The collector of the bipolar transistor and the drain of the field effect transistor are connected to the resistor-capacitor integrating network. The gate of the field effect transistor and the base of the bipolar transistor are connected together and to an ON-OFF gating signal. The ability to switch both transistors with one gating signal is a major advantage.

A further advantage of the invention is that only those types of devices are used which provide accurate switching from the OFF or open circuit state to the ON or short circuit state. Thus leakage currents to ground or other points is minimized and the switch acts more nearly like an ideal switch.

The invention can be more fully understood by reference to the attached drawings in which.

Figure 1:
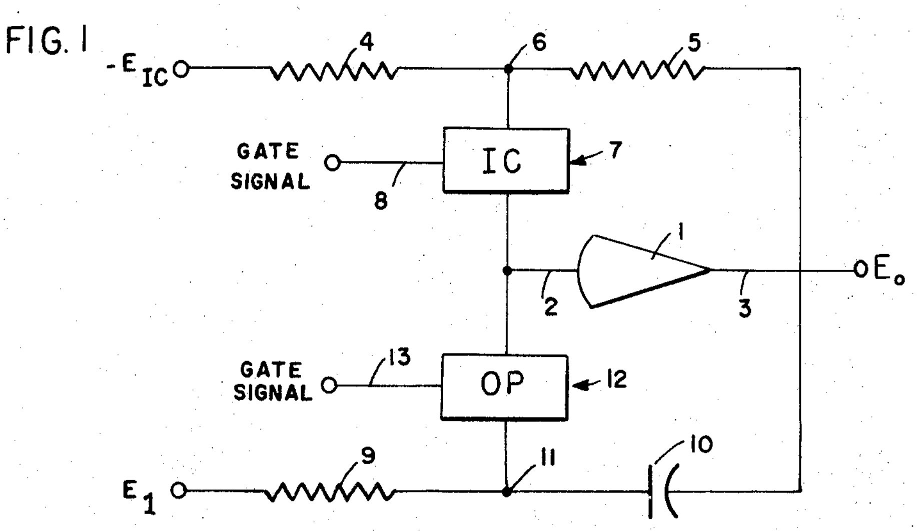
FIG. 1 is a schematic representation describing the general method for controlling the initial condition and operate modes in integrator circuits.

FIG. 1 illustrates the general method of controlling integrator operating modes in analog computers. The circuit shown includes a D-C amplifier 1 with input 2 and output 3. Resistors 4 and 5, which form an initial condition network, are connected together at the initial condition network summing junction 6. Resistor 4 is connected between the initial condition network summing junction 6 and a source of potential $-E_{IC}$. Resistor 5 is connected between the initial condition network summing junction 6 and output 3 of amplifier 1. Output voltage $E_0$ appears at output 3. Initial condition switch 7, having input 8, is connected between the initial condition network summing junction 6 and input 2 of amplifier 1. Resistor 9 and capacitor 10, which form an integrating network, are connected together at the integrating network summing junction 11. Resistor 9 is connected between a source of potential $E_1$ and the integrating network summing junction 11. Capacitor 10 is connected between output 3 of amplifier 1, and the integrating network summing junction 11. Operate switch 12 with input 13 is shown connected between input 2 of amplifier 1 and the integrating network summing junction 11. A gating signal applied to input 8 causes switch 7 to turn ON in the initial condition mode of operation, thereby connecting input potential $-E_{IC}$ through resistor 4 to input 2 of amplifier 1. When this is done $E_{IC}$ appears at the output of amplifier 1.

In the initial condition mode of operation, a gating signal applied to the input 13 of operate switch 12 turns switch 12 OFF, disconnecting integrating network resistor 9 and capacitor 10 from input 2 of amplifier 1. Within operate switch 12, capacitor 10 is grounded so that it can charge at high speed directly from the output of amplifier 1 which is at potential $E_{IC}$.

In the operate mode, gating signals are applied to inputs 8 and 13 of switches 7 and 12. These signals turn switch 7 OFF, thereby disconnecting input 2 of amplifier 1 from initial condition network summing junction 6, and turn switch 12 ON, thereby disconnecting capacitor 10 from ground and connecting it and resistor 9 to input 2 of amplifier 1 as required for integration of input potential $E_1$.

Figure 2:
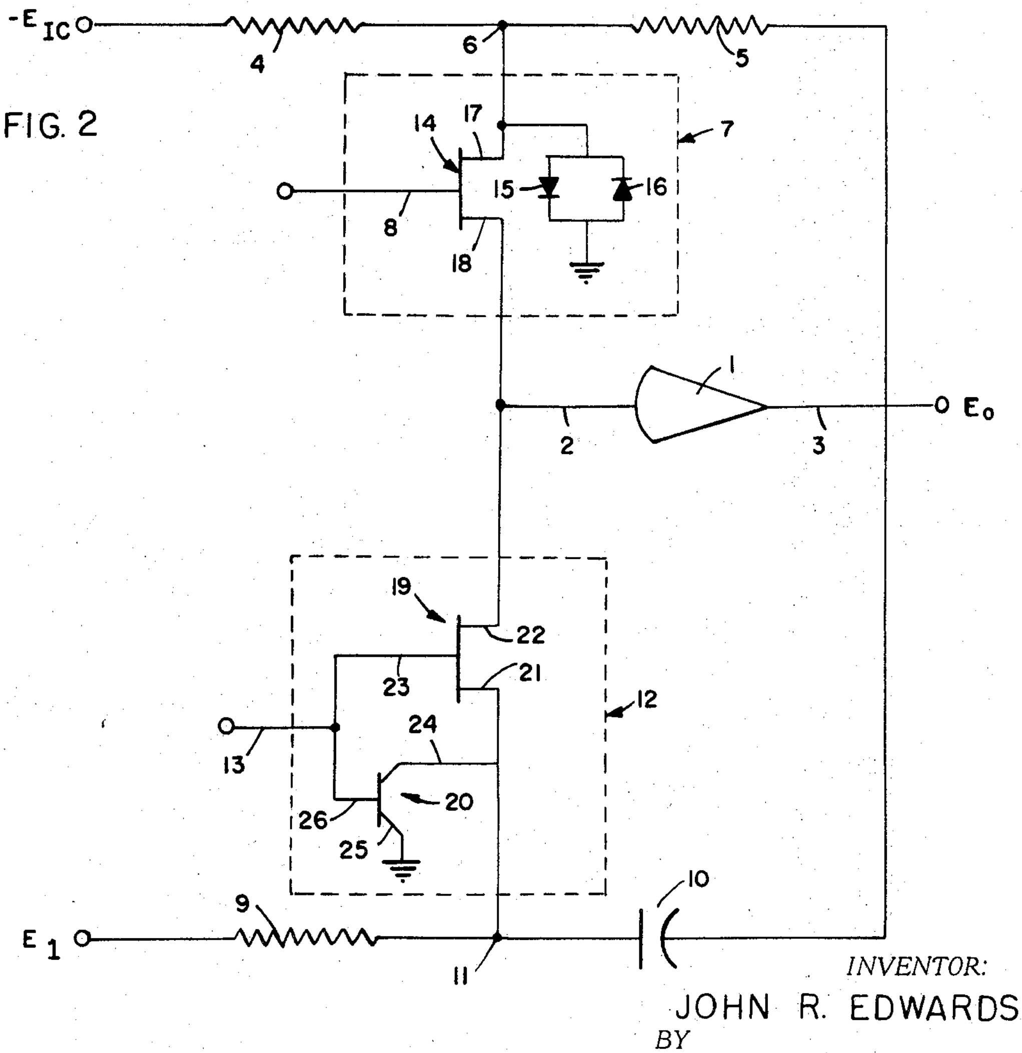
FIG. 2 is a schematic representation showing various methods of embodying the high speed switching circuitry.

FIG. 2 depicts the proposed method of accomplishing the switching functions. The overall circuit is similar to FIG. 1 except that the details of initial condition switch 7 and operate switch 12 are shown. Initial condition switch 7 is shown consisting of field effect transistor 14 and diodes 15 and 16. Field effect transistor 14 has drain 17, source 18, and gate 8'. Drain 17 is connected to initial condition network summing junction 6. Source 18 is connected to input 2 of amplifier 1. Diodes 15 and 16 are connected in parallel opposed conducting relation between drain 17 and ground. This diode circuit is used to insure that the initial condition switch 7 will stay in the OFF state until gated ON regardless of the various signals existing at drain 17 or source 18. This diode circuit insures that the voltage at drain 17 never varies more than a few tenths of a volt, thus presenting an inadvertent conduction of field effect transistor 14. A gating signal applied to gate 8' will switch field effect transistor 14 to the ON state. In the ON state, the diode circuit, consisting of diodes 15 and 16, provides a high impedance to ground thus permitting precision operation of the operational amplifier circuit, and permitting the initial condition circuit summing junction 6 to be used more flexibly than with other known circuitry.

Operate switch 12 consists of field effect transistor 19 and bipolar transistor 20. Field effect transistor 19 has drain 21, source 22, and gate 23. Transistor 20 has collector 24, emitter 25, and base 26. Source 22 is connected to input 2 of amplifier 1. Transistor 20 is arranged in grounded emitter configuration. Collector 24 and drain 21 are connected to the integrating network summing junction 11. Base 26 and gate 23 are connected to input 13. Both field effect transistor 19 and bipolar transistor 20 may be turned ON and OFF by a single gating signal on input 13. The capability of switching both transistors with one gating signal is a major advantage.

In addition, in the ON mode, both the initial condition switch circuit 7 and the operate switch circuit 12 provide a low resistance path between the desired points. In the OFF position, a very high impedance circuit is provided.

Other uses of the present invention are also apparent. For example, although various embodiments of the invention are described above in conjunction with an integrator circuit, the high speed switching circuitry disclosed may also be used more generally to connect other varieties of input and feedback networks to the input or summing junction of an amplifier.

While the invention has been particularly shown and described with reference to a preferred embodiment thereof, it will be understood by those skilled in the art that various changes in form and details may be made therein without departing from the spirit and scope of the invention.

I claim:

1. In an operational amplifier, a high speed switching circuit for rapidly altering the electrical signals appearing at the input of a direct current amplifier, said switching circuit comprising in combination:

(a) a field effect transistor having a drain, a gate and a source, said source being connected to the input of said direct current amplifier;

(b) a first initial condition network resistor means connected between the drain of said field effect transistor and the output of said direct current amplifier;

(c) a second initial condition network resistor means connected between a voltage source and the drain of said field effect transistor;

(d) input means connected to the gate of said field effect transistor for controlling the flow of current through said field effect transistor; and (e) a pair of diode means arranged in inverse parallel configuration between the drain of said field effect transistor and ground.

2. In an operational amplifier, a high speed switching circuit for rapidly altering the electrical signals appearing at the input of a direct current amplifier, said switching circuit comprising in combination:

(a) a field effect transistor having a drain, a source and a gate, said source being connected to the input of said direct current amplifier;

(b) a bipolar transistor having a collector, an emitter, and a base, said collector being connected to the drain of said field effect transistor, said emitter being connected to ground;

(c) an integrating network resistor means connected between a voltage source and the drain of said field effect transistor;

(d) an integrating network capacitor means connected between the drain of said field effect transistor and the output of said direct current amplifier; and (e) input means connected to the gate of said field effect transistor and to the base of said bipolar transistor for controlling the flow of current through said transistors.

References Cited

UNITED STATES PATENTS

| | | | |
|---|---|---|---|
| 3,304,507 | 2/1967 | Weekes et al. | 328—151 |
| 3,378,779 | 4/1968 | Priddy | 307—251 X |
| 3,140,408 | 7/1964 | May | 330—9 X |

NATHAN KAUFMAN, Primary Examiner

U.S. Cl. X.R.

303—3, 24, 110, 51, 103; 307—304, 240